United States Patent [19]

Smith et al.

[11] Patent Number: 5,627,340

[45] Date of Patent: May 6, 1997

[54] FLOOR BOX WITH IMPROVED ACTIVATION RING

[75] Inventors: Donald E. Smith; David C. Weaver, both of Memphis, Tenn.; Timothy S. Bowman, Parkersburg, W. Va.

[73] Assignee: Thomas & Betts Corporation, Memphis, Tenn.

[21] Appl. No.: 350,602

[22] Filed: Dec. 7, 1994

[51] Int. Cl.⁶ ............................................. H02G 3/18
[52] U.S. Cl. ................................. 174/48; 174/53
[58] Field of Search .......................... 174/48, 49, 53, 174/57; 220/3.7, 3.94, 4.02; 439/535, 536, 538

[56] References Cited

U.S. PATENT DOCUMENTS

| | | | |
|---|---|---|---|
| 650,432 | 5/1900 | Stewart | 174/67 |
| 707,516 | 9/1902 | Klein | 174/66 |
| 746,580 | 12/1903 | Russell | 439/535 |
| 900,773 | 10/1908 | Patterson | 174/67 |
| 901,034 | 10/1908 | Patterson | 174/67 |
| 1,579,865 | 4/1926 | Hubbell | 439/138 |
| 2,930,504 | 3/1960 | Hudson | 220/3.4 |
| 3,029,964 | 4/1962 | Hudson et al. | 220/3.4 |
| 3,127,048 | 3/1964 | Winter | 220/35 |
| 3,288,910 | 11/1966 | Zerwes | 174/53 |
| 4,059,328 | 11/1977 | Rigo | 439/535 |
| 4,289,921 | 9/1981 | Gartner et al. | 174/48 |
| 4,733,330 | 3/1988 | Tanaka et al. | 361/356 |
| 4,883,924 | 11/1989 | Hadfield | 174/48 |
| 4,979,634 | 12/1990 | Begley | 220/242 |
| 5,010,211 | 4/1991 | Bartee | 174/48 |
| 5,285,009 | 2/1994 | Bowman et al. | 174/48 |
| 5,466,886 | 11/1995 | Lengyel et al. | 174/48 |

OTHER PUBLICATIONS

Sedco Pipe Products Catalog Sheet, 1 page, Aug. 1985.

*Primary Examiner*—Kristine L. Kincaid
*Assistant Examiner*—Paramita Ghosh
*Attorney, Agent, or Firm*—Michael L. Holeter; Salvatore J. Abbruzzese

[57] ABSTRACT

A plastic floor box assembly for use with electrical raceways installed in concrete floors, having a plastic box, an activation ring, a cover plate for retaining an electrical outlet, and an outlet cover securable to the cover plate. The activation ring is secured within the open top of the floor box by a plurality of retaining clips, having barbs extending outwardly and upwardly therefrom. The barbs allow easy insertion of the activation ring into the box, while preventing withdrawal. In a second embodiment designed for use in tile floors, a pair of support clips are also provided on the activation ring to prevent over-insertion of the ring into the box.

11 Claims, 3 Drawing Sheets

5,627,340

FLOOR BOX WITH IMPROVED ACTIVATION RING

FIELD OF THE INVENTION

This invention relates generally to electrical raceway or conduit systems for installation in concrete floors and, more particularly, to an activation ring for use with a plastic floor box in such installations.

BACKGROUND OF THE INVENTION

Raceways are commonly installed in concrete slab foundations and floors, particularly in commercial construction settings, to serve as conduits for electrical and telecommunication wiring. One of the most common methods of providing electrical outlets in the floor of a commercial building is to install plastic floor boxes prior to pouring the concrete. In a typical installation, one or more raceways lead into a plastic floor box having one or more outlets mounted in its cover. Such floor boxes are commonly used with both electrical outlets and telecommunications/data ports, either separately or combined in a single box.

Installation of a conventional floor box is generally as follows. First, the box is disposed in its proper location and anchored in place. Next, the raceways (or, conduits) are attached to hubs extending from the sides of the box. The concrete is then poured to the desired depth and, after the concrete sets, the excess top portion of the box is cut off, leaving an upper edge essentially flush with the concrete surface. An activation ring is then glued in place inside the open top end of the box to provide attachment surfaces (i.e., threaded holes) for the cover plate which holds the receptacles. After the glue has hardened, the cover plate is secured to the activation ring and the receptacles and receptacle covers are installed.

In the prior art installation described above, both the box and the activation ring are formed of plastic, with a suitable adhesive being used to secure the activation ring within the box. It has been discovered that such assemblies have certain disadvantages, namely, the time consumed in applying adhesive and allowing it to cure, and the relatively low structural strength of the plastic activation ring. Accordingly, a need has been recognized for a floor box assembly having a more structurally sound activation ring which does not require adhesive during installation.

SUMMARY OF THE INVENTION

It is an object of this invention to provide a plastic floor box assembly having an improved activation ring which overcomes the disadvantages of the prior art devices.

In particular, an object of this invention is to provide a relatively strong, metallic activation ring which improves the durability of the assembly.

It is a further object of this invention to provide an improved activation ring assembly which is securable within a plastic floor box without the use of an adhesive.

In order to achieve these and other objects, the present invention comprises a plastic floor box assembly comprising a box having an open top bounded by a peripheral edge with an inner side surface, an activation ring receivable within the open top of the box, and at least one retaining clip fastenable to the activation ring, having gripping means associated therewith for operably engaging the inner side surface of the box, thereby securing the activation ring within the box upon insertion of the ring through the open top. In the preferred embodiment of this invention, the gripping means comprises a plurality of barbs extending from the retaining clip, the barbs being operative to engage the inner side surface of the peripheral edge of the open top thereby resisting removal of the activation ting while facilitating installation. Preferably, at least two retaining clips are used on opposite sides of the activation ring. In a second embodiment, a design specifically for use with tile floors, a pair of support clips are also disposed along the activation ring for engaging the concrete floor to prevent over-insertion of the ring within the box.

The above stated and other objects will become apparent to those skilled in the art upon reading the following detailed description in conjunction with the appended drawings.

DETAILED DESCRIPTION OF THE PREFERRED EMBODIMENT

Figure 1:
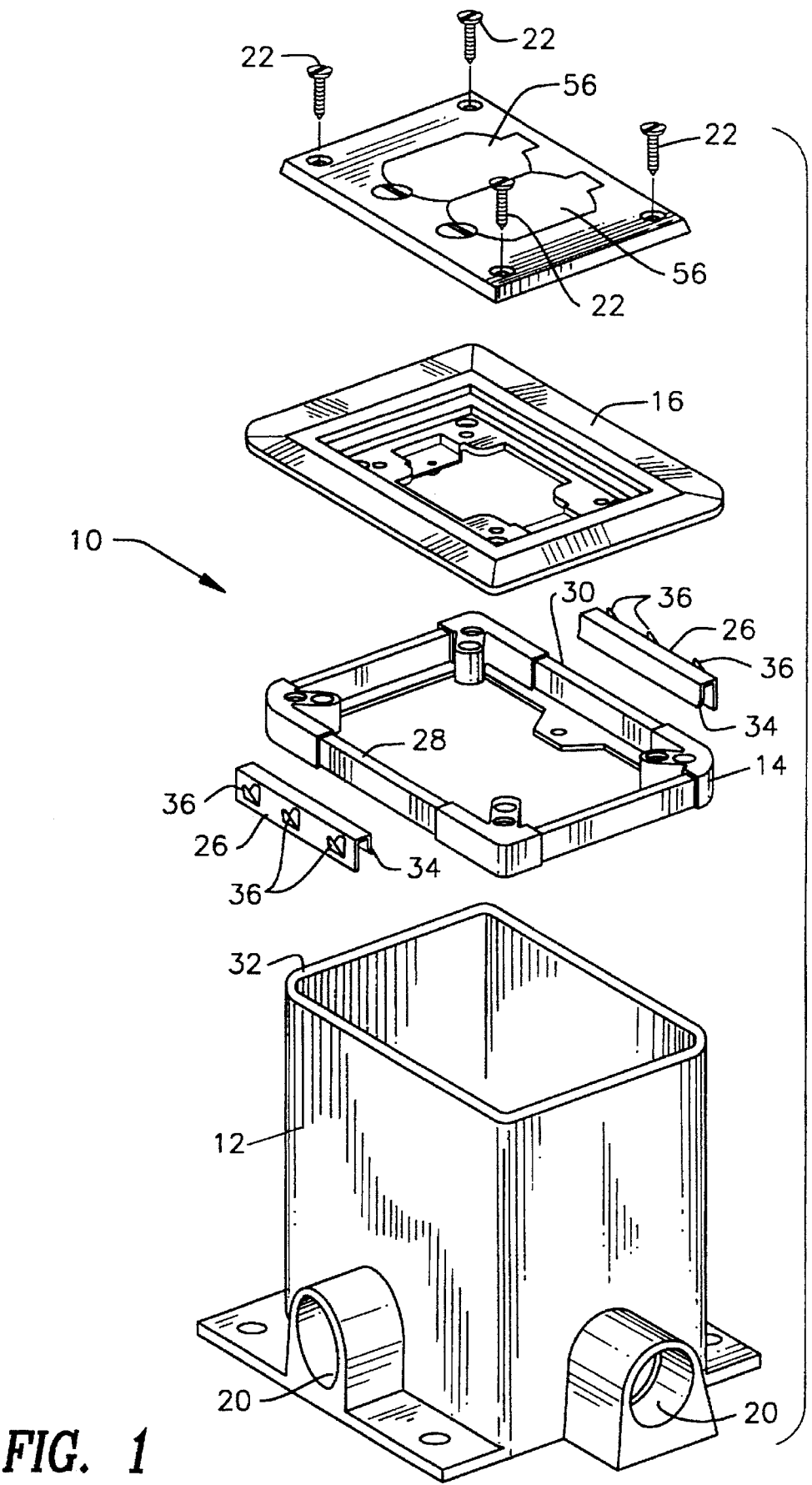
FIG. 1 is a top, front, perspective view of the floor box assembly of the present invention.

Referring initially to FIG. 1, floor box assembly 10 is shown, comprising a box 12, an activation ting 14, a cover plate 16, and outlet cover 18. Box 12 includes a plurality of hubs 20 formed near its base for receiving raceways or similar electrical conduits. Box 12 is preferably formed from polyvinylchloride (PVC) with the raceways being secured within hubs 20 by means of conventional adhesives. As those skilled in the art will readily recognize, cover plate 16 includes mounting holes for securing a conventional electrical outlet thereto, with outlet cover 18 being securable to cover plate 16 by screws 22 in a well known manner.

Figure 3:
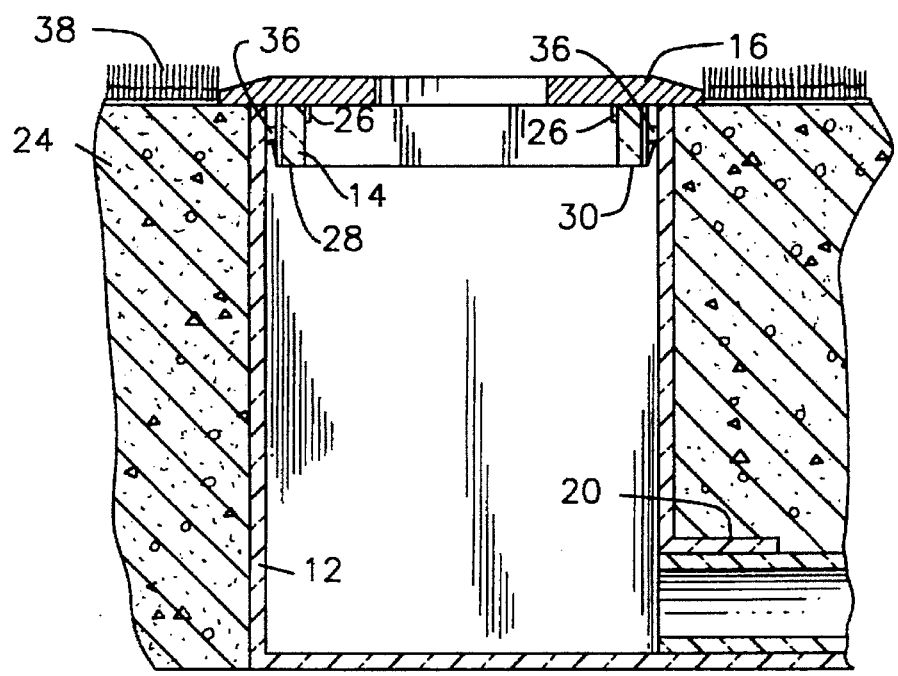
FIG. 3 is a side sectional view through the preferred embodiment shown in FIG. 1.

FIG. 3 illustrates assembly 10 as assembled in and installed in a typical concrete floor 24. As best seen in FIG. 3, activation ring 14 is secured within the open top of box 12 by a pair of retaining clips 26 secured to opposite walls 28 and 30 of activation ring 14. The upper peripheral edge 32 of box 12 defines the boundary of the open top, with activation ring 14 being configured to fit therein. Retaining clips 26 have a J-shaped cross-section, with a hook portion 34 fastenable about the upper edge of walls 28 and 30. A plurality of barbs 36 project outwardly from the opposite sides of retaining clips 26, and grippingly engage the inner surface of the walls of box 12 upon insertion of activation ring 14 into the open top thereof.

Activation ring 14 is preferably formed from die cast zinc, while retaining clips 26 are formed of spring steel. When configured to project upwardly and outwardly as shown, barbs 36 allow easy insertion of activation ring 14 into box 12, while providing more than adequate resistance to withdrawal. When cast from zinc, activation ting 14 displays superior strength and durability. Cover plate 16 may be secured directly to activation ring by a plurality of screws (not shown), with its peripheral edge overlapping a portion of the floor to prevent further insertion of activation ring 14. The use of unique retaining clips 26 in connection with activation ring 14 greatly facilitates the initial construction of floor box assembly 10 by eliminating the need to use adhesives, as is common with conventional floor boxes, while providing superior structural strength and resistance to pull out. As is evident from FIG. 3, assembly 10 is specially made for use with carpeting 38, with the peripheral edge of cover plate 16 serving as a flange which provides a smooth transition between carpet 38 and the top surface of cover plate 16.

Figure 2:
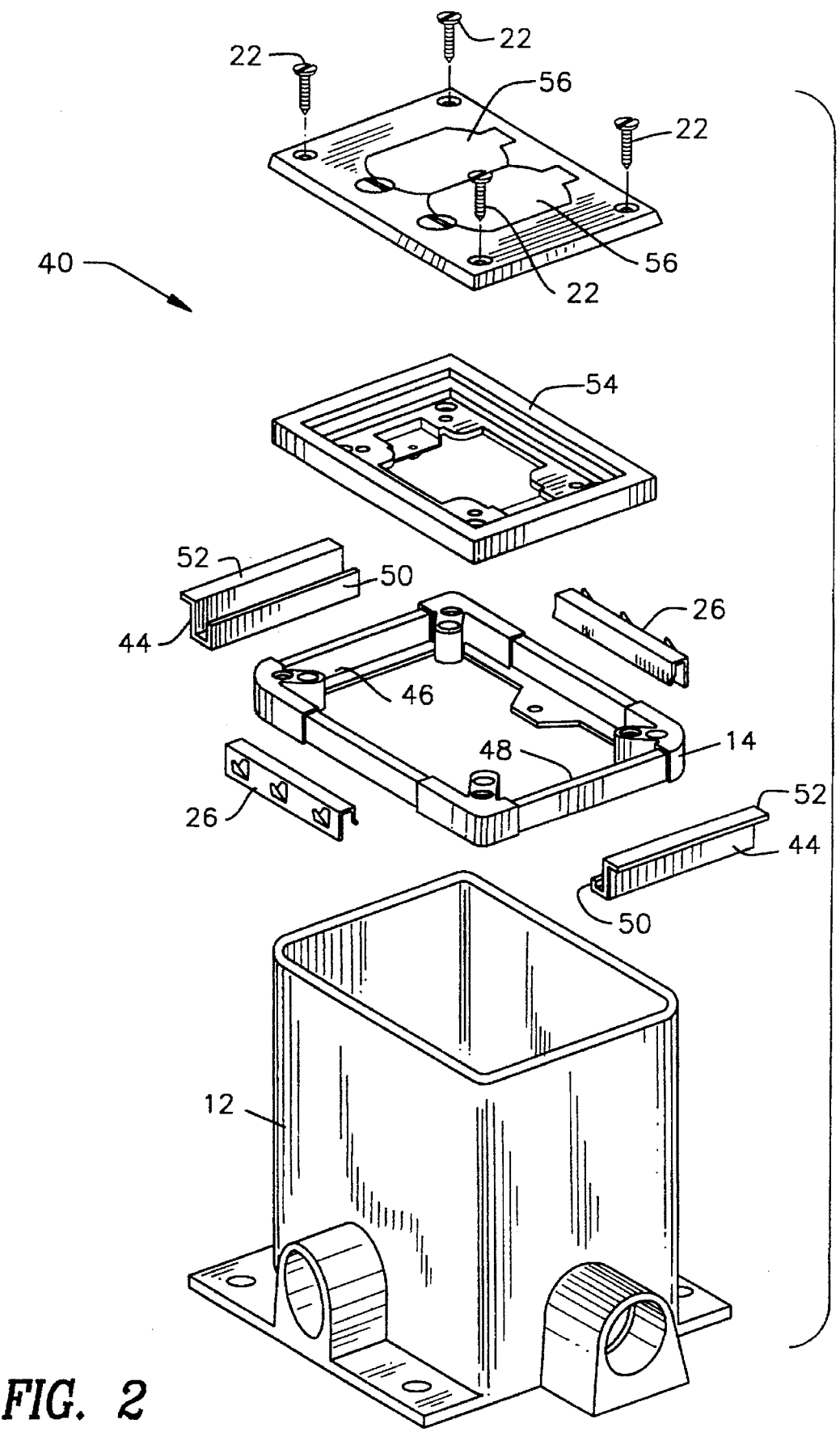
FIG. 2 is a perspective view similar to FIG. 1 showing a second embodiment of the present invention.
Figure 4:
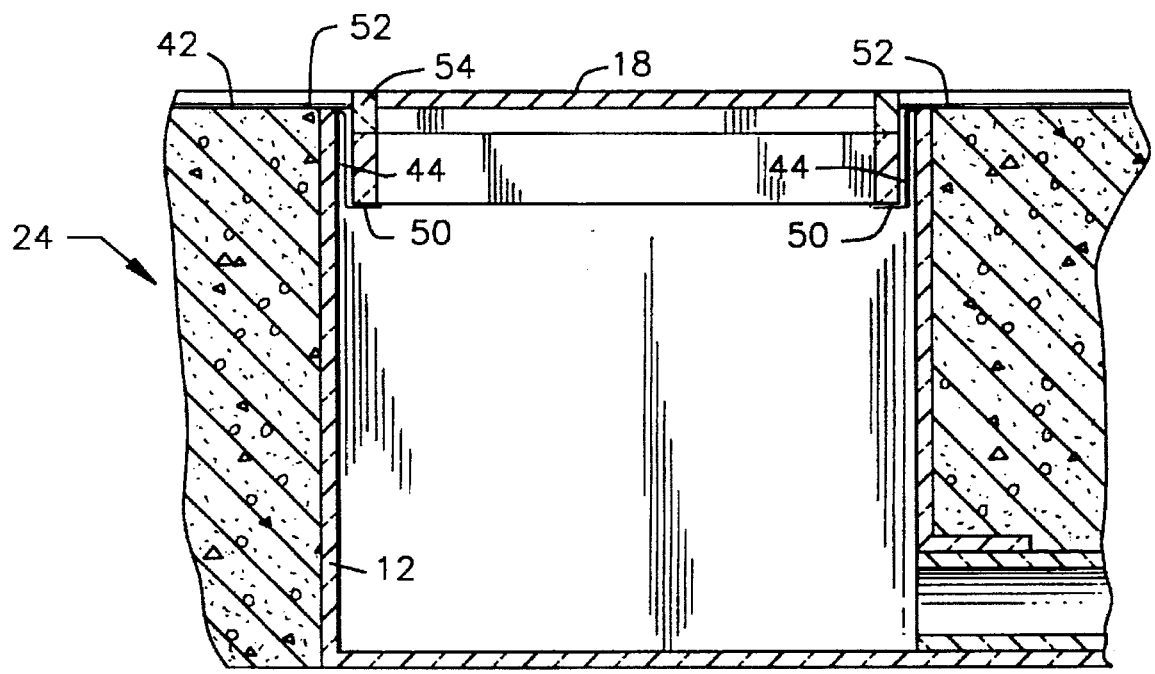
FIG. 4 is a side sectional view through the second embodiment shown in FIG. 2.

FIGS. 2 and 4 illustrate floor box assembly 40 which includes some of the same components as assembly 10 discussed above, but is specially configured for installation in a floor having a tile covering 42, rather than carpeting. In assembly 40, activation ring 14 is secured within the open top of box 12 by retaining clips 26 in the same manner as discussed above. Support clips 44 are provided on walls 46 and 48 of activation ring 14, having a lower hook portion 50 which engages the under side of walls 46 and 48, and an upper lip 52 which engages the upper peripheral edge of box 12 and a portion of concrete 24 to prevent over-insertion of activation ring 14. Plate 54 fastens to activation ring 14 by a plurality of screws (not shown) and includes mounting holes for the attachment of a conventional electrical outlet in the same manner as cover plate 16 in assembly 10. With assembly 40, however, plate 54 also fits within the open top of box 12 so that the installation is essentially flush with the surface of tile 42. Outlet cover 18 fits within the recess in plate 54, thereby maintaining the flush profile.

As disclosed herein, assemblies 10 and 40 are designed for use with a conventional outlet assembly having two electrical outlets, each covered by a hinged door 56 of plate 18. It is to be fully understood, however, that the assemblies disclosed herein may be easily adapted to accommodate a plurality of outlets simply by providing a larger box, activation ring, mounting plates, and cover plates. While the principles of providing an improved activation ring secured within a plastic box by a plurality of retaining clips have been made clear from the foregoing disclosure, it is to be expected that numerous modifications may be made in the preferred embodiments without departing from the spirit and scope of this invention. Accordingly, the scope of coverage provided by this patent should be limited only by the following claims and prior art.

What is claimed is:

1. A floor box assembly for use with electrical conduits and related wiring, comprising:

a box having an open top bounded by a peripheral edge having an inner side surface, with at least one hub formed in a wall thereof for operatively attaching one of said electrical conduits, whereby said wiring is received within said box, said box being disposable in a concrete floor;

an activation ring receivable within said open top of said box;

at least one retaining clip fastenable to said activation ring, said retaining clip having gripping means associated therewith for operatively engaging at least a portion of said inner side surface of said peripheral edge, said gripping means including at least one barb extending laterally outwardly and upwardly from said retaining clip, said barb being operative to engage said inner side surface of said peripheral edge of said open top thereby resisting removal of said activation ring from said box and securing said activation ring within said box upon insertion of said ring through said open top;

a cover plate securable to said activation ring, having mounting means associated therewith for retaining an outlet operatively connectable to said wiring; and an outlet cover, securable to said cover plate.

2. A floor box assembly as set forth in claim 1 wherein: said gripping means comprises a plurality of said barbs.
3. A floor box assembly as set forth in claim 1 wherein: said clip is formed from spring steel, and said barb is integrally formed therewith.
4. A floor box assembly as set forth in claim 1, wherein: said box and said activation ring are generally rectangular, having four sides, and:
said assembly includes two said retaining clips, disposed on opposite sides of said activation ring.
5. A floor box assembly as set forth in claim 1, wherein: said cover plate includes a flange extending laterally therefrom, said flange extending beyond said peripheral edge of said box and covering at least a portion of the floor adjacent said box.
6. A floor box assembly for use with electrical conduits and related wiring, comprising:

a box having an open top bounded by a peripheral edge having an inner side surface, with at least one hub formed in a wall thereof for operatively attaching one of said electrical conduits, whereby said wiring is received within said box, said box being disposable in a concrete floor;

an activation ring receivable within said open top of said box;

at least one retaining clip fastenable to said activation ring, said retaining clip having gripping means associated therewith for operatively engaging at least a portion of said inner side surface of said peripheral edge, thereby securing said activation ring within said box upon insertion of said ring through said open top; and at least one support clip engaging an underside portion of said activation ring, having an upper lip extending laterally therefrom for operatively engaging said peripheral edge of said box and at least a portion of the floor adjacent said edge upon installation of said activation ring, said support clip being operative to prevent over-insertion of said activation ring within said box.

7. A floor box assembly as set forth in claim 6, wherein: said box and said activation ring are generally rectangular, having four sides, and;
said assembly includes two said retaining clips disposed on opposite sides of said activation ring and two said support clips disposed on opposite sides of said activation ring, with each side of said activation ring having either a retaining clip or a support clip disposed thereon.
8. An activation ring assembly for use with a plastic electric floor box having an open top end, comprising:

a ring member comprising an annular wall adapted to fit within said open top end of said box;

at least one retaining clip secured to said wall of said ring member, said clip having gripping means associated therewith for engaging said top end of said box upon insertion of said ring member therein, said gripping means including at least one barb extending outwardly and upwardly from said retaining clip, said barb being operative to engage said open top, thereby resisting removal of said ring member from said box and retaining said ring member within said box.

9. A floor box assembly as set forth in claim 8, wherein: said gripping means comprises a plurality of said barbs.
10. A floor box assembly for use with electrical conduits and related wiring, comprising:

a box having an open top bounded by a peripheral edge having an inner side surface, with at least one hub formed in a wall thereof for operatively attaching one of said electrical conduits, whereby said wiring is received within said box, said box being disposable in a concrete floor;

an activation ring receivable within said open top of said box;

at least one retaining clip fastenable to said activation ring, said retaining clip having gripping means associated therewith for operatively engaging at least a portion of said inner side surface of said peripheral edge, said gripping means including a plurality of barbs extending from said retaining clip, said barbs being operative to engage said inner side surface of said peripheral edge of said open top, thereby resisting removal of said activation ring from said box and securing said activation ring within said box upon insertion of said ring through said open top;

a cover plate securable to said activation ring, having mounting means associated therewith for retaining an outlet operatively connectable to said wiring; and an outlet cover, securable to said cover plate.

11. An activation ring assembly for use with a plastic electric floor box having an open top end, comprising:

a ring member comprising an annular wall adapted to fit within said open top end of said box; and at least one retaining clip secured to said wall of said ring member, said retaining clip having gripping means associated therewith for engaging said top end of said box upon insertion of said ring member therein, said gripping means comprises a plurality of barbs extending from said retaining clip, said barbs being operative to engage said open top, thereby resisting removal of said ring member from said box and retaining said ring member within said box.

* * * * *